Nov. 8, 1938.                C. H. HUNSAKER                2,135,818
                              TRUSSED APPARATUS
                          Filed April 5, 1937         2 Sheets-Sheet 1
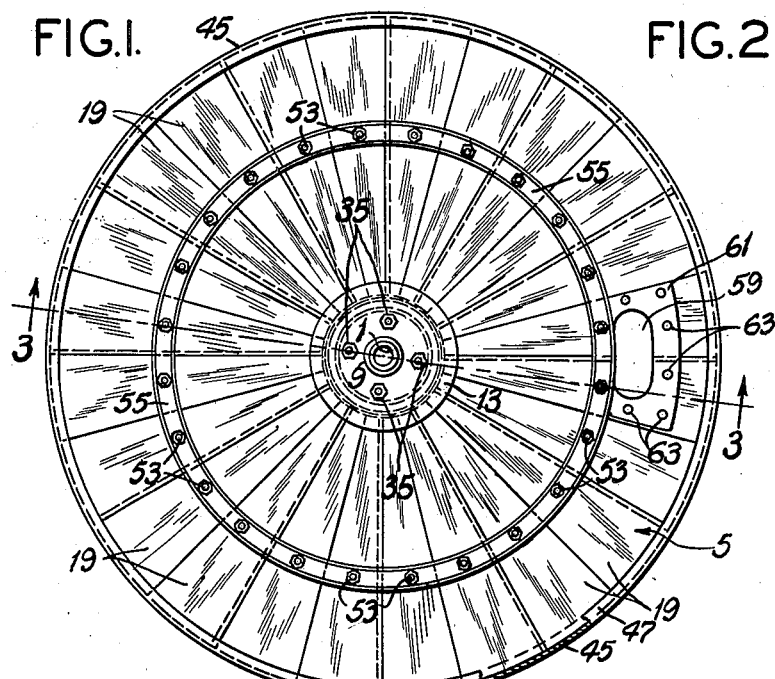
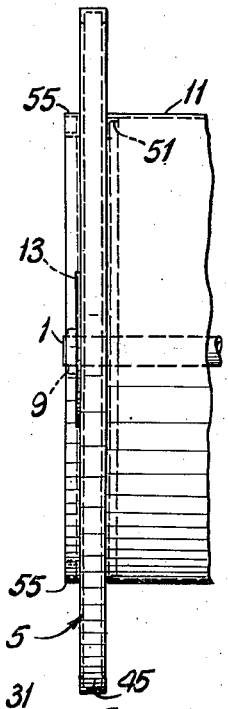
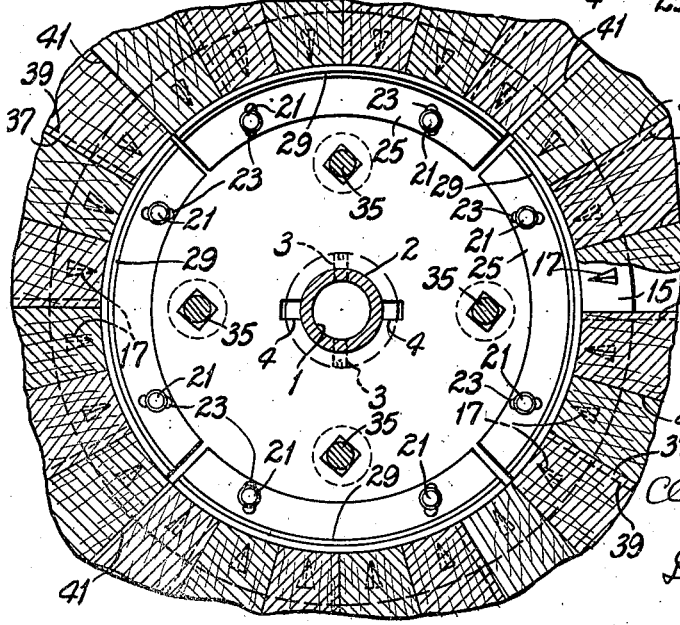
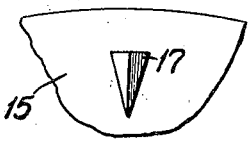
Claude H. Hunsaker, Inventor.
Delos G. Haynes, Attorney.

Nov. 8, 1938. C. H. HUNSAKER 2,135,818
TRUSSED APPARATUS
Filed April 5, 1937 2 Sheets-Sheet 2
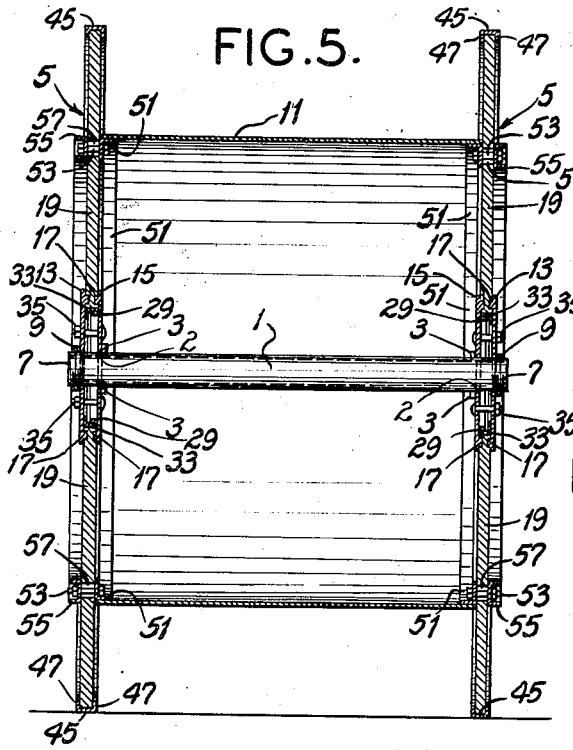
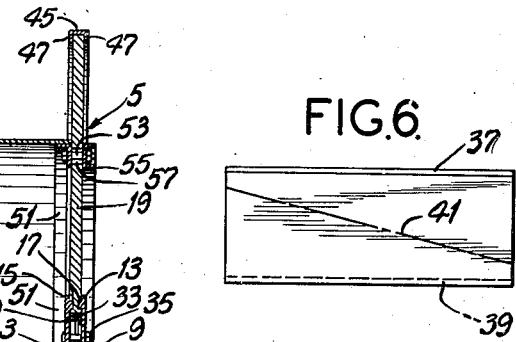
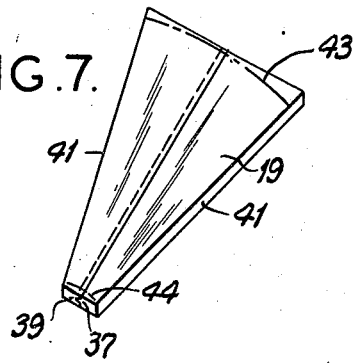
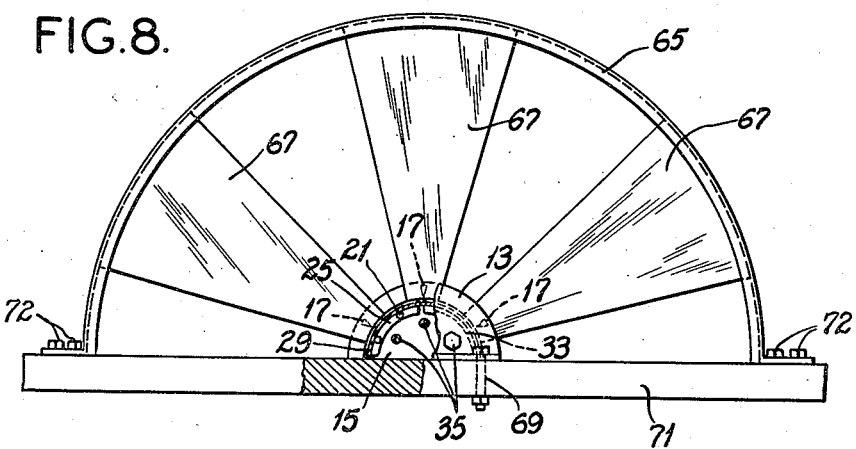
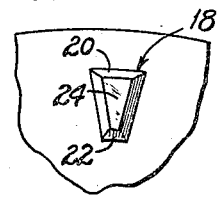
Claude H. Hunsaker,
Inventor,
Delos G. Haynes,
Attorney.

Patented Nov. 8, 1938

2,135,818

UNITED STATES PATENT OFFICE 2,135,818

TRUSSED APPARATUS

Claude H. Hunsaker, University City, Mo.

Application April 5, 1937, Serial No. 134,982

10 Claims. (Cl. 20—0.5)

This invention relates to trussed apparatus, and with regard to certain more specific features, to wooden trusses for incorporation and use generally in wheels, bridges, arches and the like.

Among the several objects of the invention may be noted the provision of a wooden truss having effective means for tightening the component members before and while in use, and after shrinkage and wear have taken place; the provision of a device of the class described in which all members throughout the life of the apparatus function to support their aliquot portion of the load; the provision of apparatus of the class described which provides an anchor for the radial members of the truss; and the provision of apparatus of the class described which is simple and economical to manufacture. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a side elevation of a cable reel having wheels embodying the invention;

Fig. 2 is a fragmentary right-end view of Fig. 1;

Fig. 3 is a cross section taken on line 3—3 of Fig. 1;

Fig. 4 is a horizontal section taken on line 4—4 of Fig. 3, certain sector members being shown in elevation, for clarity;

Fig. 5 is a vertical section of the reel shown in Fig. 1;

Fig. 6 is a diagram illustrating a cutting method for the lumber used in certain spokes;

Fig. 7 is a view similar to Fig. 6 showing a rearrangement of the cut members to form a spoke;

Fig. 8 is a side elevation of an application of the invention to a truss for bridges, arches and the like;

Fig. 9 is a detailed plan view of one form of holding lug; and,

Fig. 10 is a view similar to Fig. 9 showing another form of lug.

Similar reference characters indicate corresponding parts throughout the several views of the drawings.

Referring now more particularly to Figures 1–5, there is shown at numeral 1 an axle of a cable reel having internal stops 3. Side wheels are indicated generally at numeral 5. The axle 1 is threaded as shown at 7 at each end for receiving nuts 9 which effect the clamping of the wheels 5 against the stops 3 so that they are supported upon the axle 1. The wheels 5 support a winding drum 11 to be particularized.

Each wheel 5 comprises a male hub 13 and an opposite, female hub 15. The hubs 13 and 15 are provided peripherally with lugs 17, which are spaced a peripheral distance equal to one-half the distance between spokes of the wheel. Since as will be shown, the hubs 13 and 15 form clamps for wooden spokes 19, it will be seen that these lugs 17 are squeezed into opposite sides of these spokes. The lugs may have any of various desirable forms. One possible form is shown in Figures 3, 4 and 9, and another in Fig. 10. Generally speaking, the lugs should be of wedged shape, with the smaller end of the wedge directed inwardly toward the axle, for reasons to be given. In the Fig. 9 form, the wedges 17 each are pointed at their inner ends and have edged tops, whereas in Fig. 10 the lugs 18 have flat tops 20 and more blunt inner ends 22 which, however, are smaller than the outer ends 24. It will be understood that in Figures 9 and 10, the lugs are viewed as they are in Fig. 4.

In the hub 15 are placed guide studs 21. These studs 21 are fastened in the hub 15, and pass through slots 23 in sector plates 25. These sector plates 25 are four in number, although any other suitable number may be used, and the slots in a given plate are parallel so that the plate may move radially. Each sector plate carries a flange 29 having a tapered inside for engagement with the tapered outside 31 of a projection 33 of the hub 13. Draw studs 35 are employed between the hubs 13 and 15 for forcing the projection 33 into inside contact with the flanges 29 of the radially movable sector plates 25.

The spokes 19 are of fan-shape and are preferably manufactured in the manner diagrammatically illustrated in Figures 6 and 7. In Fig. 6 is shown an ordinary tongue-and-grooved board. The tongue is shown at numeral 37 and the groove at 39. This board is cut along a line 41 which divides it into two quadrilaterals, which, when turned end for end and the tongue 37 placed in the groove 39, provide the spoke form 19 shown in Fig. 7. In order to complete the form of the spoke, it is cut into fan-shape along the arcs 43 and 47. It will be understood that although the described form of spoke is desirable, other solid forms may be used. The purpose of cutting the spoke as outlined is to save lumber.

The purpose of using the tongue-and-groove arrangement between spokes is to prevent relatively warping movements, and to effect reciprocal reinforcing effects between spokes. The angle of the cut 41 depends upon the number of spokes to be used in the wheel.

Outside of the spokes 19 is provided a metal tire 45 having inwardly directed flanges 47 for enclosing the arcuate ends of the spokes 19.

Assembly is as follows:

The sector plates 25 on the hub 15 are pushed inwardly as far as possible. The spokes 19 are then arranged with their outer ends within the tire 45 and their inner ends abutted against the outer edges of said sector plates 25.

Next, the hub 13 is applied with the projection 33 positioned interiorly of the sector plates 25, the draw-bolts 35 being at this time applied and drawn up. Thus the annular extension 33 enters within the flanges 29 of sector plates 25 and forces these out radially so as to force radially the spokes 19 which they abut. Forcing it into the inside of the tire 45. At the same time the lugs 17 are forced toward one another to bite into the opposite sides of the spokes.

The length of the slots 23 is such that the initial drawing-up operation on the stud 35 causes the slot 23 to traverse about half the total possible distance with respect to the studs 21. This leaves another length of slot available for subsequent adjustments of the apparatus while it is in use. It will be understood that any given adjustment may be less than the amount that would take up the motion available, so that several adjustments may be made in service, before the available motion is entirely exhausted. Adjustments are desirable after shrinkage due to drying has taken place, or wear, or abuse or the like.

A feature that should be noted is the peripheral bracing action of the lugs 17. These prevent the loosening up of any spoke 19 under distortion of the tire 45, as in passing over rough ground, or when the apparatus is dropped. The fact that the lugs 17 are tapered inwardly accounts for the ability of the outwardly forced sector plates 25 to force the spokes 19 radially with respect to said lugs 17. That is, the lugs 17 relatively plough their way toward the inner end of the spoke, as the spoke is forced outwardly by the adjustment and the draw studs 35. Thus an extremely rigid structure is obtained initially and upon adjustment.

Next, the drum 11 is applied between the wheels 5. It is supported on inner flanges 51 which are held by bolts 53, the latter passing through radial slots in the spokes 19 and also fastening outside iron braces 55. The radial slots are indicated by the numerals 57. It will be seen that when the radial adjustment is made, that the bolts 53 should preferably be loosened so that the spokes 19 may easily move radially with respect to the braces 51 and 55.

An advantage of the invention is the fact that the spoke members are placed in relatively equal or even compression throughout, thereby increasing their total bearing power or strength. This feature correspondingly reduces the wood thickness which would ordinarily be necessary in the spokes.

It is also to be noted that the rings 51 and 55, when tightened up, effect a clamping action upon the spokes at about their mid-points and reciprocal bracing between spokes. These rings have the effect of substantially shortening the unbraced portion of the spokes. Thereby the strength of the wood of the spoke, considered endwise, is substantially increased, because this is in inverse proportion to the unbraced lengths of the spokes. Hence this feature contributes to the ability to use lighter spokes, thus decreasing weight without decreasing strength.

To hold the wheels 5 up against the ends of the drum 11, the axle 1 is applied. This is done before applying the threaded caps 9. The openings 2 in the hubs 13 and 15 are notched as at 4 to permit passage of the stops 3. After the stops are inside of the drum 11, and the axle is in place, a slight turn misaligns the stops and notches, so that thereafter to each wheel 5 is clamped between a stop 3 and a nut 9, the nuts 9 being threaded on for this purpose. In Fig. 3 the stop 3 is shown before turning and tightening and in Fig. 4 it is shown after turning and tightening. Under tightened conditions the drum 11 is snugly supported upon the flanges 51.

In the case of a cable reel, it is desirable that an opening such as shown at 59 be placed in one wheel so that the cable may be brought out through said opening for fastening purposes and the prevention of unraveling during the time that the cable is not being unwound. This opening is braced by a surrounding plate 61 held in place by fasteners 63.

From the above it will be seen that there has been provided a form of wheel, which at the time of manufacture may be placed in a rigid state, and which after shrinkage in use, may thereafter be adjusted for rigidity. It will be understood that the wheel, although shown as being applied to a cable reel, could be applied to other uses, and that the invention may be adapted to other forms of wheels.

In Fig. 8 is shown an application of the invention to an object having a circular arc less than 360°, and it is to be understood that the invention may be applied to other apparatus having arcs of other amounts.

In Fig. 8 there is substituted for the tire 45 a semi-circular band 65 of U-shape section adapted to abuttingly receive spokes 67 or struts. The struts 67 are spaced from one another, and their inner ends are held within hubs 13 and 15 which carry cooperating members 33 and 25, respectively, for radial movement against the inner ends of the struts 67. The hubs 13 and 15 again carry lugs such as 17 biting and holding the inner ends of the struts 67.

The hubs 13 and 15 are semi-circular in form and they are suitably flanged to be held by bolts such as shown at numeral 69. Bolting is done to a beam 71, and the ends of the member 65 are likewise bolted to said means 71 as at 72. It will be seen that after adjustment, that there is compression in the struts 67, as was the case in the spokes 19, and that these members are forced against the member 65 to tension it. Reaction is against the center of the means 71. For subsequent adjustment it is necessary that the holes for bolts 69 be made slightly large to permit of axial hub movement. The whole device may be used as a truss in any desired location.

In all forms of the invention, the respective spokes or radial members 19 or 67 are independent and the actions and reactions are such that each assumes an aliquot part of the load. Furthermore, loosening of one strut or spoke can not take place independently of the others, so that there is not the likelihood of applying all the load to less than the whole number of struts. This is of value in the case where the invention is applied to trusses, because many of these after use, heretofore tended to apply the load to less than the whole number of members.

It will be seen that the portion 33 on the hub 13 is in the nature of a wedge or cam.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. An article of manufacture comprising a peripheral band, oppositely disposed hubs within the band, radial means reaching from the band to points between the hubs, gripping means peripherally on the hubs for the inner ends of the radial means, radially movable means on one hub, means on the other hub adapted to force said radially movable means against the inner ends of the radial means, and means to draw together said hubs, whereby the radial means are forced toward the band.

2. An article of manufacture comprising a peripheral band, oppositely disposed hubs within the band, wooden spokes reaching from the band to points between the hubs, gripping means peripherally on the hubs for the inner ends of the spokes, radially movable means on one hub, means on the other hub adapted to force said radially movable means against the inner ends of the spokes, and means to draw together said hubs whereby the spokes are forced radially into the band, and lugs on the peripheral clamping portions of the hub adapted to bite into the spokes.

3. An article of manufacture comprising a peripheral band, oppositely disposed hubs within the band, wooden spokes reaching from the band to points between the hubs, gripping means peripherally on the hubs for the inner ends of the spokes, radially movable means on one hub, means on the other hub adapted to force said radially movable means against the inner ends of the spokes, and means to draw together said hubs whereby the spokes are forced radially into the band, and lugs on the peripheral clamping portions of the hubs adapted to bite into the spokes, said lugs being tapered with their smaller ends directed inwardly from the outer band.

4. An araticle of manufacture comprising a beam, an arched band fastened at opposite ends to the beam, axially movable hubs on the beam, radial struts extending from between the hubs to the band, movable means on one hub engaging the inner ends of the struts, camming means therefor on the other hub, and clamping means adapted to force said hubs together to cause the camming means to move the movable means so as to compress the spokes radially into the band.

5. An article of manufacture comprising a peripheral band, oppositely disposed hubs within the band, radial means reaching from the band to points between the hubs, gripping means peripherally on the hubs for the inner ends of the radial means, radially movable means on one hub, means on the other hub adapted to force said radially movable means against the inner ends of the radial means, means to draw together said hubs, whereby the radial means are forced toward the band, and bracing means between the respective radial means located between their inner and outer ends.

6. An article of manufacture comprising a peripheral band, oppositely disposed hubs within the band, radial means reaching from the band to points between the hubs, gripping means peripherally on the hubs for the inner ends of the radial means, radially movable means on one hub, means on the other hub adapted to force said radially movable means against the inner ends of the radial means, and means to draw together said hubs, whereby the radial means are forced toward the band, and bracing means between the respective radial means between their inner and outer ends, said bracing means comprising at least one circular band held to the radial means.

7. An article of manufacture comprising a peripheral band, oppositely disposed hubs within the band, radial means reaching from the band to points between the hubs, gripping means peripherally on the hubs for the inner ends of the radial means, radially movable means on one hub, means on the other hub adapted to force said radially movable means against the inner ends of the radial means, and means to draw together said hubs, whereby the radial means are forced toward the band, bracing means between the respective radial means between their inner and outer ends, said bracing means comprising circular members on opposite sides of the radial means and located between their inner and their outer ends, and clamping means between said oppositely located members.

8. An article of manufacture comprising a peripheral band, oppositely disposed hubs within the band, radial means reaching from the band to points between the hubs, gripping means peripherally on the hubs for the inner ends of the radial means, radially movable means on one hub, means on the other hub adapted to force said radially movable means against the inner ends of the radial means, means to draw together said hubs, whereby the radial means are forced toward the band, and bracing means between the respective radial means between their inner and outer ends, said bracing means comprising tongue-and-groove connections between the respective spokes between their inner and outer ends.

9. An article of maufacture comprising a peripheral band, oppositely disposed hubs within the band, radial means reaching from the band to points between the hubs, gripping means peripherally on the hubs for the inner ends of the radial means, radially movable means on one hub, means on the other hub adapted to force said radially movable means against the inner ends of the radial means, means to draw together said hubs, whereby the radial means are forced toward the band, bracing means between the respective radial means between their inner and outer ends, said bracing means comprising at least one circular bracing member attached to the radial means between their inner and outer ends, and tongue-and-groove connections between the respective radial means.

10. An article of manufacture comprising a peripheral band, oppositely disposed hubs within the band, radial means reaching from the band to points between the hubs, gripping means peripherally on the hubs for the inner ends of the radial means, radially movable means on one hub, means on the other hub adapted to force said radially movable means against the inner ends of the radial means, means to draw together said hubs, whereby the radial means are forced toward the band, bracing means between the respective radial means between their inner and outer ends, said bracing means comprising radially disposed tongue-and-groove connections between the respective radial means, oppositely located circular bands between the inner and outer ends of the radial means, and means for drawing together said bands against opposite sides of the radial means.

CLAUDE H. HUNSAKER.